(No Model.)

G. J. SMITH.
WHIFFLETREE.

No. 437,006. Patented Sept. 23, 1890.

Witnesses
Geo. W. Young.
N. E. Oliphant

Inventor
George J. Smith
By Stout & Underwood
Attorneys

UNITED STATES PATENT OFFICE.

GEORGE J. SMITH, OF MILWAUKEE, WISCONSIN.

WHIFFLETREE.

SPECIFICATION forming part of Letters Patent No. 437,006, dated September 23, 1890.

Application filed November 25, 1889. Serial No. 331,429. (No model.)

*To all whom it may concern:*

Be it known that I, GEORGE J. SMITH, of Milwaukee, in the county of Milwaukee, and in the State of Wisconsin, have invented certain new and useful Improvements in Whiffletrees; and I do hereby declare that the following is a full, clear, and exact description thereof.

My invention relates to whiffletrees; and it consists in certain peculiarities of construction and combination of parts to be hereinafter described with reference to the accompanying drawings and subsequently claimed.

Figure 1:
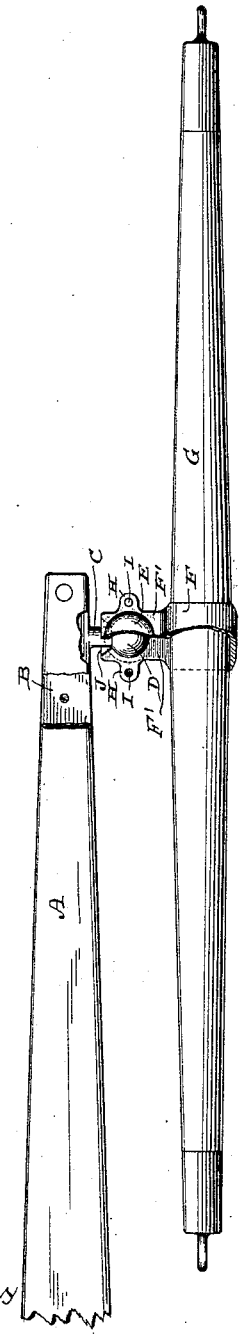
Figure 3:
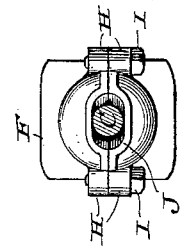
Figure 2:
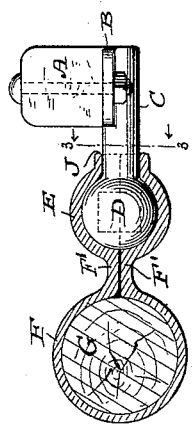

In the drawings, Figure 1 represents a plan view of a portion of a doubletree and a singletree connected thereto in accordance with my invention, certain of the parts being broken away for the purpose of better illustration; Fig. 2, an end view, partly in section; and Fig. 3, a rear elevation, partly in section, on line 3 3, Fig. 2.

Referring by letter to the drawings, A represents a portion of a doubletree, and secured to the under side of the same are the lateral ears B of a shank C, that projects in front of the doubletree, the forward end of this shank being in the shape of a ball D for engagement with a socket E, that forms part of a clip F on a singletree G, said clip being one continuous piece of metal bent to encircle the singletree and extend in rear thereof.

The socket E is formed by hemispherical recesses in the opposing rearward extensions F' of the clip F, and these extensions are provided with lateral ears H for engagement with clamping bolts or screws I, while at the same time those portions of said extensions in the rear of the socket are transversely recessed to form a slot J for engagement with the straight portion of the shank C, the ends of this slot being preferably beveled to permit of said shank assuming the greatest possible angle to the right or left. The slot J allows for the horse motion of the singletree, and the latter can be readily turned up at right angles to the doubletree in order to economize space in a barn.

By the construction above described I provide a simple anti-rattling connection between a doubletree and singletree, while at the same time there are no parts liable to break or get out of order.

Having thus described my invention, what I claim as new, and desire to secure by Letters Patent, is—

The combination of the shank C, provided with the lateral securing-ears B and the ball D, the clip F in one continuous piece bent to encircle a singletree and having the rearward extensions F', provided with the hemispherical recesses that unite to form the socket E and the transverse recesses that unite to form the slot J, the lateral ears H on said extensions, and the clamping bolts or screws I, engaging the latter ears, substantially as set forth.

In testimony that I claim the foregoing I have hereunto set my hand, at Milwaukee, in the county of Milwaukee and State of Wisconsin, in the presence of two witnesses.

GEORGE J. SMITH.

Witnesses:
  N. E. OLIPHANT,
  WM. KLUG.